(12) United States Patent
Ichikawa et al.

(10) Patent No.: US 6,239,057 B1
(45) Date of Patent: May 29, 2001

(54) CATALYST FOR THE CONVERSION OF LOW CARBON NUMBER ALIPHATIC HYDROCARBONS TO HIGHER CARBON NUMBER HYDROCARBONS, PROCESS FOR PREPARING THE CATALYST AND PROCESS USING THE CATALYST

(75) Inventors: Masaru Ichikawa; Ryuichiro Ohnishi; Linsheng Wang, all of Sapporo (JP)

(73) Assignee: UOP LLC, Des Plaines ( * ) Notice: Subject to any disclaimer, the term of this patent is extended or adjusted under 35 U.S.C. 154(b) by 0 days.

(21) Appl. No.: 09/232,351

(22) Filed: Jan. 15, 1999

(51) Int. Cl.[7] .................................................. B01J 29/06
(52) U.S. Cl. ................. 502/66; 502/64; 502/71; 502/74
(58) Field of Search ................ 502/64, 60, 66, 502/71, 74, 300

(56) References Cited

U.S. PATENT DOCUMENTS 3,855,115 * 12/1974 Morrison ............................. 208/135
4,265,787 * 5/1981 Schwartz .............................. 502/66
4,349,461 * 9/1982 Chu et al. .............................. 502/64
4,475,483 * 10/1984 Robinson ............................. 502/300
4,568,663 * 2/1986 Mauldin .............................. 502/325
4,655,906 * 4/1987 Bjornson et al. ..................... 208/217
4,766,105 * 8/1988 Lauritzen ............................. 502/216
4,784,750 * 11/1988 Dufresne et al. .................... 208/120
5,114,899 * 5/1992 Lin ...................................... 502/158
5,380,697 * 1/1995 Matusz et al. ....................... 502/348
5,677,259 * 10/1997 Yamase et al. ...................... 502/313
5,990,365 * 11/1999 Chang et al. ........................ 585/475

* cited by examiner

*Primary Examiner*—Tom Dunn
(74) *Attorney, Agent, or Firm*—John G. Tolomei; Frank S. Molinaro

(57) ABSTRACT

A catalyst for producing higher carbon number hydrocarbons, e.g., benzene from low carbon number hydrocarbons such as methane has been developed. The catalyst comprises a porous support such as ZSM-5 which has dispersed thereon rhenium and a promoter metal such as iron, cobalt, vanadium, manganese, molybdenum, tungsten and mixtures thereof. A process for preparing the catalyst and a process for converting low carbon number aliphatic hydrocarbons to higher number hydrocarbons in the presence of CO or $CO_2$ at on conditions are also described.

12 Claims, No Drawings

CATALYST FOR THE CONVERSION OF LOW CARBON NUMBER ALIPHATIC HYDROCARBONS TO HIGHER CARBON NUMBER HYDROCARBONS, PROCESS FOR PREPARING THE CATALYST AND PROCESS USING THE CATALYST

FIELD OF THE INVENTION

This invention relates to a catalyst for producing higher carbon number hydrocarbons from low carbon number hydrocarbons, such as methane. The catalyst comprises a porous support having dispersed thereon rhenium and a metal selected from the group consisting of iron, cobalt, vanadium, manganese, molybdenum, tungsten and mixtures thereof. An example of the porous support is zeolite ZSM-5. This invention also relates to a process for preparing the catalyst and a process for producing higher carbon number hydrocarbons using the catalyst. The process for preparing higher carbon number hydrocarbons comprises contacting low carbon number aliphatic hydrocarbons with a catalyst in the presence of CO or $CO_2$ at conversion conditions to produce the higher carbon number hydrocarbons.

BACKGROUND OF THE INVENTION

It is well known to produce aromatic compounds such as benzene, toluene and xylenes from petroleum naphtha streams. Attempts have also been made to produce useful aromatic compounds from low molecular weight aliphatic compounds by, for example, the pyrolysis of natural gas, acetylene and other gases. However, this technique produces benzene and other useful aromatic compounds in very low yields while producing large amounts of tar, insoluble carbon residue and high molecular weight aromatic compounds, all of which are of little commercial use. Specifically, in the pyrolysis of methane and acetylene, the reaction is carried out at a temperature of about 1,000° C. or higher with a conversion rate of only a few percent and a selectivity to naphthalenes of less than 1%. Consequently, this method has little practical application.

There are reports in the art of processes for converting natural gas into aromatic compounds. For example, U.S. Pat. No. 5,288,935 discloses a process for producing liquid hydrocarbons from natural gas, in which natural gas is first separated into a methane rich fraction and a $C_2+$ fraction, the methane is then selectively oxidized with oxygen, the effluent from the selective oxidation is then mixed with a part of the $C_2+$ fraction and pyrolyzing the resulting mixture to obtain an aromatic product. The final step is carried out at a temperature of about 300° C. to about 750° C. in the presence of an aromatizing catalyst consisting essentially of a zeolite, gallium, at least one metal from the Group VIII metals and rhenium and at least one additional metal selected from the group consisting of: tin, germanium, lead, indium, thallium, copper, gold, nickel, iron, chromium, molybdenum and tungsten; an alkaline metal or alkaline earth metal and an aluminum matrix.

It is also known that the dehydrocondensation of methane with CO or $CO_2$ to form benzene and naphthalene can be carried out using a molybdenum/HZSM-5 or iron/cobalt modified Mo/HZSM-5. S. Liu, Q. Dong, R. Ohonishi and M. Ichikawa, *Chem. Commun.* (1998), p. 1217–1218, and S. Liu, L. Wang, Q. Dong, R. Ohonishi, and M. Ichikawa, *Stud. Surf. Sci. Catal.*, Vol. 119, p. 241–246. In contrast to this art, applicants have developed a novel catalyst which comprises rhenium on a porous support such as a zeolite and which optionally can contain other metals such as iron, cobalt, platinum and molybdenum. It has been found that the catalysts of the present invention have higher activities for converting methane to benzene and also have a higher selectivity for the higher carbon number hydrocarbon products such as benzene, toluene and xylene and ethane and ethylene.

SUMMARY OF THE INVENTION

As stated, the present invention relates to a catalyst for converting low carbon number aliphatic hydrocarbons to higher carbon number hydrocarbons, a process for preparing the catalyst, and a process for converting low carbon number aliphatic hydrocarbons to higher carbon number hydrocarbons. Accordingly, one embodiment of the invention is a catalyst for converting low carbon number aliphatic hydrocarbons to higher carbon number hydrocarbons comprising a porous support having dispersed thereon rhenium and a promoter metal selected from the group consisting of iron, cobalt, vanadium, gallium, zinc, chromium, manganese, molybdenum, tungsten and mixtures thereof. Another embodiment of the invention is a process for preparing the catalyst described above, the process comprising impregnating the support with a rhenium compound and a promoter metal compound, calcining the impregnated support at calcination conditions to give a calcined product and treating the calcined product with hydrogen and methane at treatment conditions to give the catalyst.

Yet another embodiment of the invention is a process for converting low carbon number aliphatic hydrocarbons to higher carbon number hydrocarbons comprising contacting the low carbon number aliphatic hydrocarbons at conditions to give the higher carbon number hydrocarbons. These and other objects and embodiments will become more apparent after a detailed description of the invention.

DETAILED DESCRIPTION OF THE INVENTION

One aspect of the current invention is a novel catalyst for carrying out dehydrocondensation of methane. One essential element of this catalyst is a porous inorganic oxide support. This support can be chosen from a wide variety of supports which have a high surface area, porous structure and are preferably acidic. Examples of these supports include zeolites, non-zeolitic molecular sieves, silica, alumina and mixtures thereof. The zeolites which can be used as the support include any of those which have a $SiO_2/)Al_2O_3$ ratio between 1 and 8,000 and preferably in the range of about 10 to about 100. The zeolites have channels or pores of about 0.5 to about 10 nm. The porous zeolite may contain Al, Ti, Zr, Ga, Zn, V, Cr and mixtures thereof, i.e., a metallosilicate. The surface area of these materials is preferably in the range of about 100 to about 1,000 $m^2/g$. Specific examples of the molecular sieves which can be used as the support for the present catalyst include zeolite Y, zeolite X, mordenite, ZSM-5, ALPO-5, VPI-5, FSM-16, MCM-22 and MCM-41. The inorganic support may be used in any desirable form such as powder, pellets, extrudates, spheres, and irregularly shaped particles.

Having formed the support into a desired shape, the next step in preparing the catalyst is to disperse rhenium and a promoter metal onto the support. The promoter metal which can be present is selected from the group consisting of iron, cobalt, vanadium, manganese, gallium, zinc, chromium, tungsten, molybdenum and mixtures thereof.

The rhenium and promoter metal can be dispersed on the porous support by means well known in the art such as impregnation, spray-drying, ion-exchange, vapor deposition, etc. Impregnation of the support with the rhenium and promoter metal can be carried out using decomposable compounds of rhenium and the promoter metals. By decomposable compound is meant that upon heating the compound decomposes to give the corresponding metal or metal oxides. Example of the rhenium compounds which can be used are $NH_4ReO_4$, $CH_3ReO_3$, $Re_2O_7$, $ReO_3$, $ReS_2$, $Re_2S_7$, $Re_2(CO)_{10}$, $NH_4Re(CO)_5$, $MnRe(CO)_{10}$, $Co[Re(CO)_5]_2$, $M_2[Re_3H_3(CO)_{10}]$, $Re_3H(CO)_{14}$, $M_2[Re_4H_4(CO)_{12}]$, $M_2[Re_4(CO)_{16}](M=NEt_4, NBu_4, Li, Na, K$ and $NH_4)$, $ReCl_3$, $ReC_{l5}$, $[Re_2X_3(CO)_7](X=l, Cl, Br)$ $[Re(CO)_6]$ $[Re_2F_{11}]$; $M'[Re_6S_9X'_6](M'=NBu_4, NEt_4; X'=Cl, Br)$; $M''_2[ReS_8(Py)_2X''_4(M''=NBu_4, X''=Cl, Br, py=pyridine)$.

Examples of the compounds of iron, cobalt, vanadium, manganese and molybdenum which can be used include the halides, nitrates, sulfates, phosphates, carbonates, acetates and oxalates. Other examples of molybdenum compounds which can be used include ammonium paramolybdate, 12-phosphomolybdic acid, 12-silicomolybdic acid and 12-phosphomolybdic vanadic acid, $MoS_3$, $Mo(CO)_6$, $[Mo_3(CH_3C)(O)(CH_3COO)_9]X(X=Cl, Br$ and $l)$ and $(Mo_2(CH_3COO)_6$ and mixtures thereof. The rhenium and promoter metal may be deposited on the support by vapor deposition, ion-exchange or impregnation from a common aqueous or organic solvent solution, sequentially in any order. A preferred method comprises first depositing rhenium on the support and then depositing at least one promoter metal. The preferred method of depositing rhenium and the promoter metal is by impregnation. It should be pointed out that when zeolites or molecular sieves are the supports both deposition and ion-exchange of the metals can occur. Therefore, in the present context, impregnation will encompass ion-exchange as well as conventional impregnation. When the rhenium and promoter metal are impregnated sequentially, after the rhenium has been impregnated, the resulting impregnated support is dried and calcined at a temperature of about 50° C. to about 800° C. to give a calcined rhenium support and then impregnation is carried out with a solution containing at least one metal compound. After this second impregnation, or after the rhenium and metal compounds have been co-impregnated, the support is calcined at a temperature of about 50° C. to about 800° C. for a time of about 0.5 hr. to about 100 hr. Next, the calcined catalyst is activated by treating the catalyst with a hydrogen/ and/or methane treatment gas at a temperature of about 100° C. to about 800° C. for a time of about 0.5 hr. to about 100 hr. The amount of rhenium and promoter metal which is dispersed in the final catalyst can vary considerably, but usually for the rhenium varies from about 0.001 wt. % to about 50 wt. % of the support and for the promoter metal varies from about 0.001 wt. % to about 50 wt. % of the support.

Having obtained the catalyst of the invention, it can now be used in a process for converting low carbon number aliphatic hydrocarbons to higher number hydrocarbons. More specifically, the process if a dehydrocondensation process in which aliphatic compounds such as methane are converted to aromatic compounds such as benzene and naphthalene plus ethylene or ethane. Since dehydrogenation is part of the reaction, hydrogen is produced during the process. By low carbon number aliphatic hydrocarbons is meant any aliphatic hydrocarbon having from 1 to 4 carbon atoms. The process works especially well with methane. Therefore, the feedstream which can be used in the process of the invention, can be any feedstream which contains at least 5% methane and preferably at least 20% methane.

Provided the gas stream contains at least the above amounts of methane, the stream can also contain $C_2$–$C_4$ saturated and unsaturated hydrocarbons such as ethane, ethylene, acetylene, propane, propylene, n-butane, isobutane, butene, isobutene, etc.

The gas stream is contacted with the catalyst at conversion conditions either in a batch mode or a continuous flow mode, with continuous flow being preferred. In the continuous flow mode, the catalyst can be present as a fixed bed, moving bed, or fluidized bed. The process is carried out by contacting the feedstream in the absence of oxygen at a temperature of about 300° C. to about 1000° C. and preferably at a temperature of about 450° C. to about 900° C., a pressure of about 10 kPa to about 1000 kPa and preferably from about 100 to about 1000 kPa and a weight hourly space velocity in the range of about 100 to about 200,000 $hr^{-1}$. It is also preferred that the reaction zone contain CO, $CO_2$ or mixtures thereof, component in order to increase the selectivity to benzene and other aromatic compounds. The CO, $CO_2$ or mixtures thereof to methane ratio varies from about 0.001 to about 0.5 and preferably from about 0.01 to about 0.3. The effluent from the reaction zone can be separated by conventional means and the unreacted feed gas recycled to the reaction zone.

In order to more fully illustrate the invention, the following examples are set forth. It is to be understood that the examples are only by way of illustration and are not intended as an undue limitation on the broad scope of the invention as set forth in the appended claims.

EXAMPLE 1 (10% Re/HZSM-5)

A rhenium on ZSM-5 was prepared by the incipient wetness method as follows. In a container 5.0 g of the ammonium form of ZSM-5, having a $SiO_2/Al_2O_3$ ratio of about 40 and a surface area of about 925 $m^2/g$ (obtained from Toso Co.) were contacted with 5 ml of an aqueous solution of $NH_4ReO_4 \cdot (0.75$ g). The impregnated support was then dried at 120° C. and then calcined at 500° C. for 6 hours. The catalyst was identified as catalyst A.

EXAMPLE 2 (3% Re/HZSM-5)

A catalyst having 3% rhenium on HZSM-5 was prepared as in Example 1 except that the amount of $NH_4ReO_4$ was adjusted to give 3% Re. This catalyst was identified as Catalyst B.

EXAMPLE 3 (20% Re/HZSM-5)

A catalyst having 20% rhenium on HZSM-5 was prepared as in Example 1 except that the amount of $NH_4ReO_4$ was adjusted to give 20% Re. This catalyst was identified as Catalyst C.

EXAMPLE 4 (10% Re/0.5% Co/HZSM-5)

A catalyst containing 10% rhenium and 0.5% cobalt was prepared by taking 5.0 grams of catalyst A and impregnating it with 5 ml of an aqueous solution of $Co(NO_3)_2(0.078$ g). The impregnated support was then dried at 120° C. then calcined at 500° C. for 6 hours. This catalyst was identified as Catalyst D.

EXAMPLE 5 (10% Re/1.0% Fe/HZSM-5)

A catalyst containing 10% rhenium and 1% iron on HZSM-5 was prepared by taking 5 grams of catalyst A and impregnating it with 5 ml of an aqueous solution of $Fe(NO_3)_3(0.22$ g). The impregnated support was then dried at 120°

C. followed by calcination at 500° C. for 6 hours. This catalyst was identified as Catalyst E.

EXAMPLE 6 (10% Re/1.0 Pt/HZSM-5)

A 10% rhenium and 1.0% platinum on HZSM-5 was prepared by taking 5 grams of catalyst A and impregnating it with 5 ml of an aqueous solution of $H_2PtCl_6$. The impregnated catalyst was dried at 120° C. and then calcined at 500° C. for 6 hours. This catalyst was identified as Catalyst F.

EXAMPLE 7

A 10% Re/HZSM-5 catalyst was prepared using different sources of rhenium. The support which was used was the ammonium form of HZSM-5, as described in Example 1. A 5 gram sample of HZSM-5 was used along with the impregnation, drying and calcination conditions set forth in Example 1. The table below gives the catalyst identification, the rhenium source and the amount of rhenium used to prepare the catalysts.

| Catalyst I.D. | Re Source | Amount (g) |
| --- | --- | --- |
| G | $Re_2O_7$ | 0.65 |
| H | $Re_2(CO)_{10}$* | 0.878 |

*dissolved in 50 ml. of hexane.

EXAMPLE 8 (10% Re FSM-16)

A 10% rhenium on FSM-16 support was prepared by the incipient wetness procedure using 5.0 grams of FSM-16 (pore size equal 2.7 nm, SA=1020 m²/g, $SiO_2/Al_2O_3$=300) with 5 ml of an aqueous solution of $NH_4ReO_4$ (0.75 g). The impregnated support was now dried at 120° C. and then calcined at 500° C. for 6 hours. The catalyst was identified as Catalyst I.

EXAMPLE 9 (10% Re/SiO₂)

A 10% rhenium on silica was prepared be impregnating silica gel (obtained from Fuji-Devison Company), SA=280 m²/g with 50 ml of an aqueous solution of $Re_2O_7$ (0.65 g). The impregnated support was next dried at 120° C. and then calcined at 500° C. for 6 hours. This catalyst was identified as catalyst

EXAMPLE 10 (10% Re/Al₂O₃)

A 10% rhenium on alumina catalyst was prepared by impregnating 5.0 grams of gamma alumina pellets obtained from Strem Chemical Company (SA=380 m²/g) with 50 ml of an aqueous solution of $Re_2O_7$ (0.65 g). The impregnated support was next dried at 120° C. and then calcined at 500° C. for 5 hours. This catalyst was identified as Catalyst K.

EXAMPLE 11 (10% Re/Carbon)

A 10% rhenium on carbon was prepared by impregnating 5.0 grams of carbon from Takeda Company (SA=980 m²/g) with a hexane solution of $Re_2(CO)_{10}$ (0.88 g). The impregnated support was next treated with hydrogen at 350° C. for 6 hours and exposed to air at 25° C. for 2 hours. The catalyst was identified as catalyst L.

EXAMPLE 12

A series of catalysts containing 10% rhenium on HZSM-5 in which the HZSM-5 had a different $SiO_2/Al_2O_3$ ratio were prepared using $NH_4ReO_4$ (0.75 g) as the rhenium source following the procedure set forth in example 1. The following table identifies the catalyst and the $SiO_2/Al_2O_3$ ratio of HZSM-5 sample.

| Catalyst I.D. | $SiO_2/Al_2O_3$ |
| --- | --- |
| M | 20 |
| N | 40 |
| P | 80 |
| Q | 150 |

EXAMPLE 13 (1 5% Mo/HZSM-5)

A 15% molybdenum HZSM-5 was prepared by the incipient wetness as follows: to a 5.0 g of the ammonium form of ZSM-5, having a $SiO_2/Al_2O_3$ ratio of 40 and a surface area of about 925 M²/g there were added 5 ml of an aqueous solution of $(NH_4)_6Mo_7O_{24}$ (1.38 g). The impregnated support was next dried at 120° C. and then calcined at 500° C. for 6 hours. This catalyst was identified as Catalyst R and is a reference catalyst.

EXAMPLE 14

Catalysts A to Q were tested for the conversion of methane to aromatics by the following procedure. In a quartz reactor of 8 mm I.D. by 250 mm in length, there were placed 0.30 g of the respective catalyst after being pelletized having a size of about 20 to 42 mesh. The reactor was heated to 700° C. and flushed with helium at which time a feed gas of either pure methane or methane plus CO and/or $CO_2$ (1.8–15 vol. %) was introduced at a flow rate of 7.5 ml/min. An internal standard of 2% argon was added to the methane feed stream. The product effluent and the inlet reactants were analyzed by gas chromatography. By using the following equations, the methane conversion and selectivity can be calculated In equations (1)–(3), F, X and Ncarbon represent the total gas flow rate, mole fraction and carbon number in a molecule, respectively. Similarly, selectivity for the formation of a hydrogen-containing product on hydrogen basis can be calculated and, thus, the ratio of hydrogen to carbon in the coke formed can be estimated.

$$F^{inlet} \times X_{Ar}^{inlet} = F^{outlet} \times X_{Ar}^{outlet} \qquad (1)$$

Thus, methane conversion can be calculated as follows, $$\text{Conv.} = \frac{F^{inlet} \times X_{methane}^{inlet} - F^{outlet} \times X_{methane}^{outlet}}{F^{inlet} \times X_{methane}^{inlet}} = 1 - \frac{X_{methane}^{outlet} \times X_{Ar}^{inlet}}{X_{methane}^{inlet} \times X_{Ar}^{outlet}} \qquad (2)$$

and each product selectivity on carbon basis is calculated by $$S_{product}^{carbon} = \frac{F^{outlet} \times X_{product}^{outlet} \times N_{product}^{carbon}}{F^{inlet} \times X_{methane}^{inlet} - F^{outlet} \times X_{methane}^{outlet}} = \qquad (3)$$

$$\frac{X_{Ar}^{inlet} \times X_{product}^{outlet} \times N_{product}^{carbon}}{X_{Ar}^{outlet} \times X_{methane}^{inlet} - X_{Ar}^{inlet} \times X_{methane}^{outlet}}$$

These results are presented in the following tables.

TABLE 1

Performance of Various Catalysts for Methane Dehydrocondensation.[1]

| Catalyst I.D. | $CH_4$ Conv. (%) | Selectivity (%) | | |
|---|---|---|---|---|
| | | $C_2$ | Bz* | Np* |
| 3%Re/HZSM-5 (B) | 4.9 | 19 | 65 | 5 |
| 10%Re/HZSM-5 (A) | 6.6 | 15 | 65 | 10 |
| 20%Re/HZSM-5 (C) | 7.0 | 18 | 62 | 13 |
| 10%Re/0.5%CO/HZSM-5[2] (D) | 4.8 | 28 | 64 | 2 |
| 10%Re/1.0%Fe/HZSM-5[2] (E) | 6.2 | 25 | 67 | 3 |
| 10%Re/1.0%Pt/HZSM-5[3] (F) | 4.2 | 28 | 63 | 5 |
| 15%Mo/HZSM-5 (R) | 7.8 | 2 | 62 | 24 |

*Bz = benzene; Np = naphthalene
[1]Unless otherwise stated, reaction conditions were 300 kPa of $CH_4$ pressure, temperature of 700° C. and a space velocity of 1440 hr$^{-1}$.
[2]temperature = 750° C.
[3]temperature = 600° C.

TABLE 2

Effect of Rhenium Compound and Support on Catalyst Performance[2]

| Catalyst I.D. | $CH_4$ Conv. (%) | Selectivity (%) | | |
|---|---|---|---|---|
| | | $C_2$ | Bz* | Np* |
| 3%$Re_2O_7$/HZSM-5 (G) | 4.9 | 19 | 65 | 5 |
| 10%$Re_2(CO)_{10}$/HZSM-5 (H) | 7.5 | 19 | 72 | 10 |
| 10%$NH_4ReO_4$/FSM-16 (I) | 1.2 | 48 | 36 | — |
| 10%$Re_2O_7$/$SiO_2$ (J) | 3.8 | 22 | 60 | 5 |
| 10%$Re_2O_7$/$Al_2O_3$ (K) | 0.8 | 18 | 64 | 8 |
| 10%$Re_2(CO)$/carbon (L) | 1.2 | 20 | 67 | 7 |

*Bz = benzene; Np = naphthalene
[1]Reaction conditions were: 300 kPa pressure of $CH_4$; temperature of 700° C. and space velocity of 1440 hr$^{-1}$.

TABLE 3

Effect of Space Velocity and Si/Al Ratio On Catalyst Performance[1]

| Catalyst I.D. | Space Velocity | $CH_4$ Conv. (%) | Selectivity (%) | | |
|---|---|---|---|---|---|
| | | | $C_2$ | Bz* | Np* |
| 10%Re/HZSM-5 (Si/Al = 40) (N) | 1440 | 9.2 | 27 | 60 | 2 |
| 10%Re/HZSM-5 (Si/Al = 40) (N) | 2500 | 6.5 | 32 | 58 | 3 |
| 10%Re/HZSM-5 (Si/Al = 40) (N) | 5000 | 4.8 | 50 | 49 | — |
| 10%Re/HZSM-5 (Si/Al = 40) (N) | 10000 | 1.8 | 60 | 35 | — |
| 10%Re/HZSM-5 (Si/Al = 20) (M) | 5000 | 0.4 | 58 | 32 | — |
| 10%Re/HZSM-5 (Si/Al = 80) (P) | 5000 | 4.2 | 43 | 50 | 2 |
| 10%Re/HZSM-5 (Si/Al = 150) (Q) | 5000 | 0.24 | 57 | 38 | — |

*Bz = Benzene; Np = Naphthalene
[1]Reaction conditions were: temperature = 750° C.; pressure 300 kPa

TABLE 4

Effect of CO and $CO_2$ on the Performance of a 10% Re/HZSM-5 (Si/Al = 40) Catalyst[1] (A)

| Gas Feed Composition (%) | | | | Time on Stream (min.) | $CH_4$ Conv. (%) | Selectivity (%) | | |
|---|---|---|---|---|---|---|---|---|
| CO | $CO_2$ | $CH_4$ | Ar | | | $C_2$ | Bz* | Np* |
| 11.9 | — | 78.8 | 9.3 | 100 | 9.6 | 12 | 75 | 8 |
| 11.9 | — | 78.8 | 9.3 | 400 | 8.3 | 15 | 76 | 6 |
| 8.6 | — | 81.7 | 9.7 | 100 | 8.4 | 14 | 72 | 8 |
| 8.6 | — | 81.7 | 9.7 | 600 | 8.2 | 15 | 75 | 6 |
| 22.2 | — | 69.6 | 8.2 | 100 | 9.2 | 14 | 76 | 6 |
| 22.2 | — | 69.6 | 8.2 | 500 | 8.6 | 13 | 77 | 5 |
| 22.2 | — | 69.6 | 8.2 | 2000 | 8.2 | 15 | 73 | 3 |
| — | 2 | 87.6 | 10.4 | 120 | 12.5 | 18 | 72 | 6 |
| — | 2 | 87.6 | 10.4 | 420 | 11.8 | 21 | 70 | 3 |
| — | 3 | 87.6 | 9.7 | 100 | 10.2 | 23 | 67 | 5 |
| — | 3 | 87.6 | 9.7 | 420 | 9.8 | 25 | 65 | 3 |

*Bz = benzene; Np = naphthalene
[1]Reaction conditions were: temperature = 750° C.; pressure = 300 kPa and S.V. = 5,000 hr$^{-1}$

CONCLUSIONS

It is observed from the results in the above tables that the conversion of methane to higher molecular-weight hydrocarbons, e.g., ethylene, benzene, proceeds with higher yields on rhenium and rhenium modified catalysts versus a molybdenum only (prior art) catalyst. Further, the addition of CO or $CO_2$ increases the yield of benzene and the stability of the catalyst.

We claim as our invention:

1. A catalyst for converting low carbon number aliphatic hydrocarbons to higher carbon number hydrocarbons consisting essentially of a porous support selected from the group consisting of ZSM-5, FSM-16 and mixtures thereof, having dispersed thereon rhenium and a promoter metal selected from the group consisting of iron, cobalt, vanadium, manganese, gallium, zinc, clromium, molybdenum and mixtures thereof, and where the rhenium is present in an amount of about 3 to about 20 wt. % of the support.

2. The catalyst of claim 1 where the rhenium is present in an amount from about 10 to about 20 wt. % of the support.

3. The catalyst of claim 1 where the promoter metal is present in an amount from about 0.001 to about 50 wt. %.

4. A process of preparing a catalyst for converting low carbon number aliphatic hydrocarbons to higher carbon number hydrocarbons comprising a porous support having dispersed thereon rhenium and a metal selected from the group consisting of iron, cobalt, vanadium, manganese, gallium, zinc, chromium, molybdenum and mixtures thereof, the process comprising impregnating the support with a rhenium compound and a metal compound, calcining the impregnated support at calcination conditions to give a calcined product and treating the calcined product with a gas selected from the group consisting of hydrogen, methane and mixtures thereof at treatment conditions to give the catalyst.

5. The process of claim 4 where the support is impregnated with a solution containing a rhenium compound and a metal compound.

6. The process of claim 4, where the support is first impregnated with a solution containing a rhenium compound, calcining the rhenium impregnated support at a temperature of about 100° C. to about 800° C. to give a calcined rhenium support, and then impregnating the calcined rhenium support with a solution containing a metal compound.

7. The process of claim 4 where the rhenium compound is selected from the group consisting of $NH_4ReO_5$, $CH_3ReO_3$, $Re_2O_7$, $ReO_3$, $ReS_2$, $Re_2S_7$, $Re_2(CO)_{10}$, $NH_4Re$ $(CO)_5$, $MnRe(CO)_{10}$, $Co[Re(CO)_5]_2$, $M_2[Re_3H_3(CO)_{10}]$, $Re_3H(CO)_{14}$, $M_2[Re_4H_4(CO)_{12}]$, $M_2[Re_4(CO)_{16}]$(M=$NEt_4$, $NBu_4$, Li, Na, K and $NH_4$), $ReCl_3$, $ReC_{l5}$, $[Re_2X_3(CO)_7]$ (X=I, Cl, Br) $[Re(CO)_6][Re_2F_{11}]$; $M'[Re_6S_9X'_6]$(M'=$NBu_4$, $NEt_4$; X'=Cl, Br); $M''_2[ReS_8(Py)_2X''_4]$(M''=$NBu_4$, X''=Cl, Br, py=pyridine).

8. The process of claim 4 where the support is selected from the group consisting of silica, alumina, zeolite ZSM-5, FSM-16 and mixtures thereof.

9. The process of claim 8, where the support is zeolite ZSM-5.

10. The process of claim 8, where the support is FSM-16.

11. The process of claim 4 where the calcination conditions include a temperature of about 100° C. to about 800° C. for a time of about 0.5 to about 100 hours.

12. The process of claim 4 where the treatment conditions include a temperature of about 150° C. to about 800° C. and a time of about 0.5 to about 100 hours.

\* \* \* \* \*